Aug. 15, 1967 K. KUMPOLT 3,335,442
DOCK LEVELLING UNITS
Filed March 23, 1965 4 Sheets-Sheet
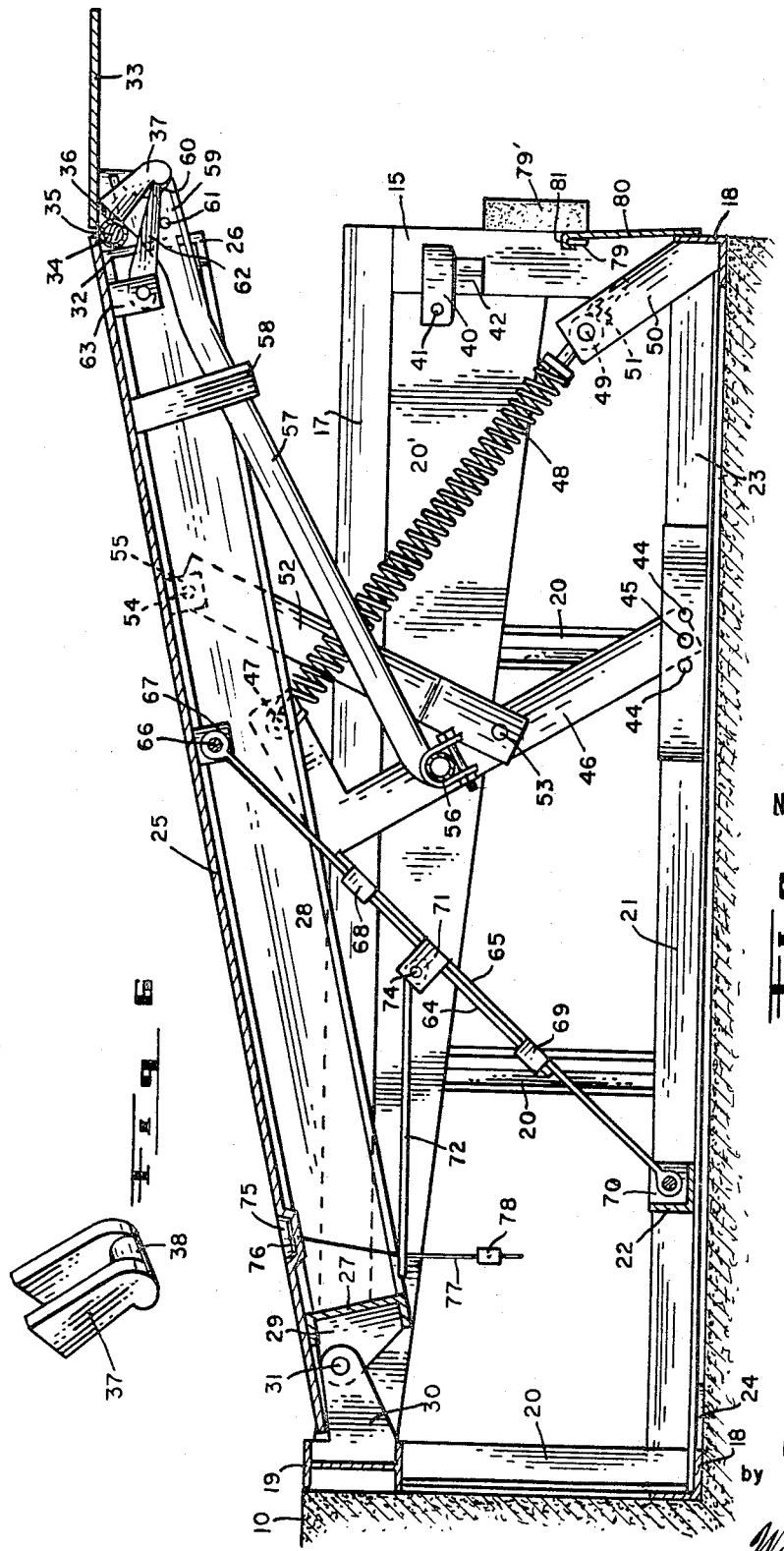
INVENTOR
Karl Kumpolt
by
*Walter C. Baggs*
Agent

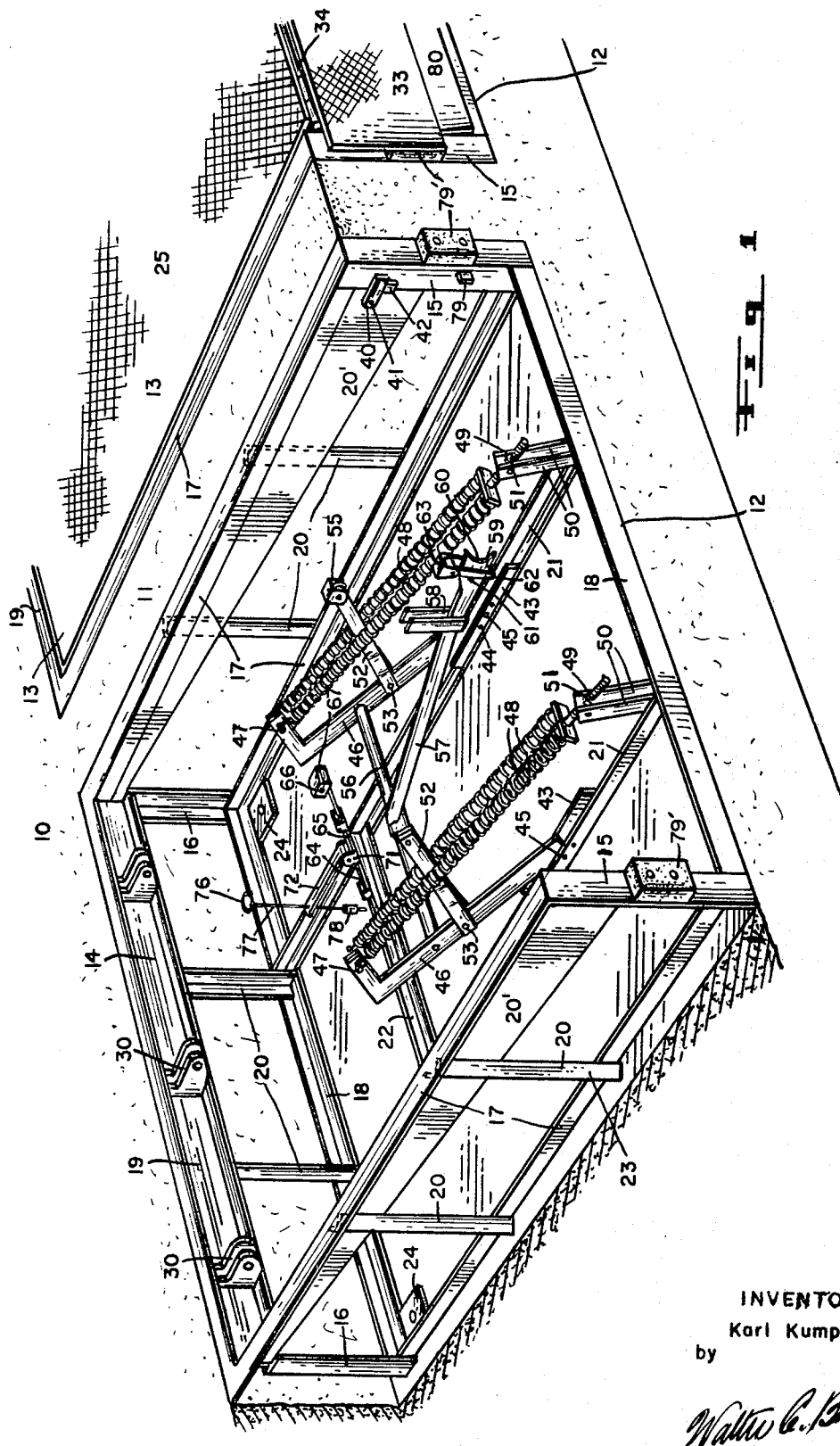

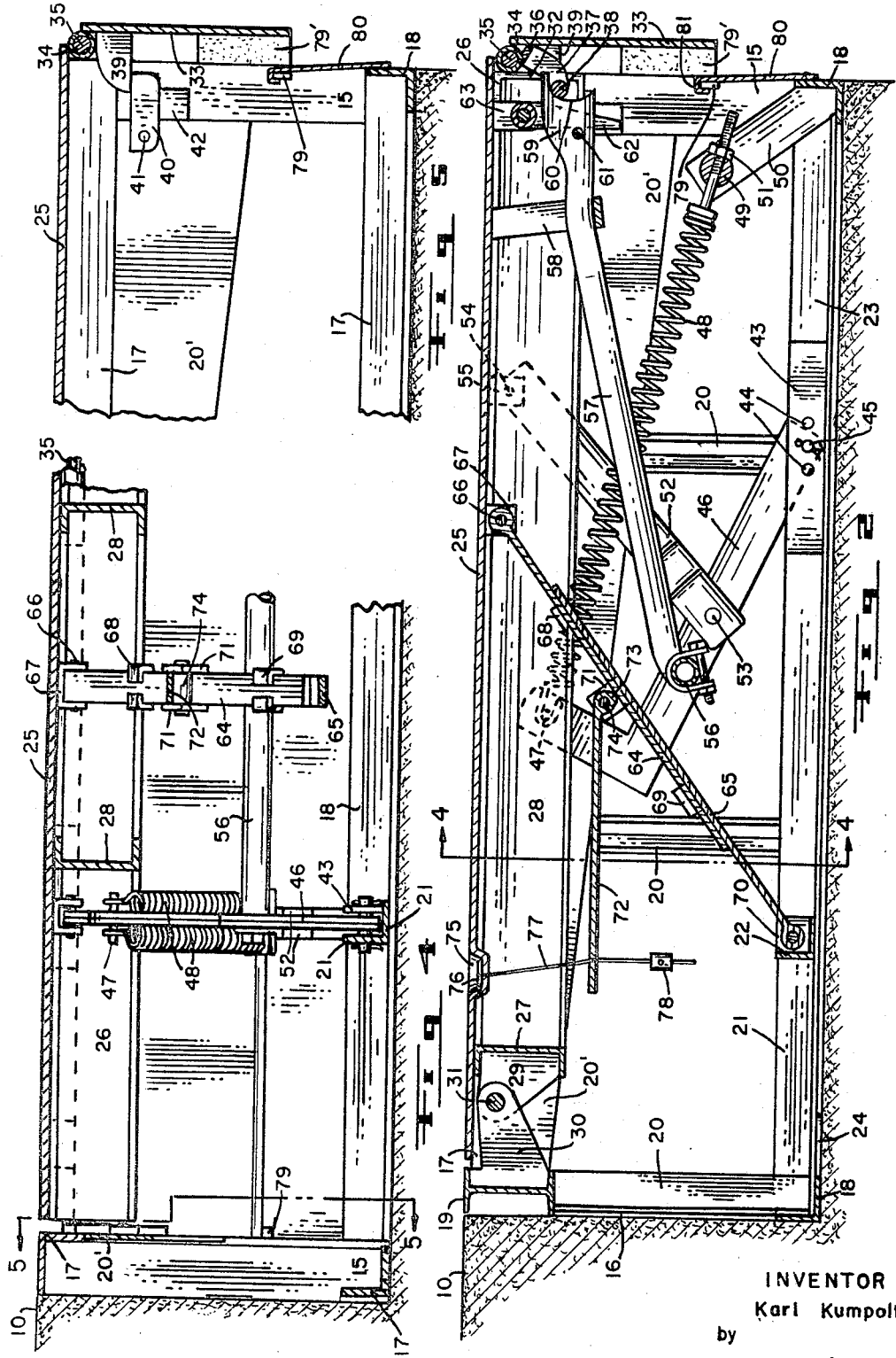

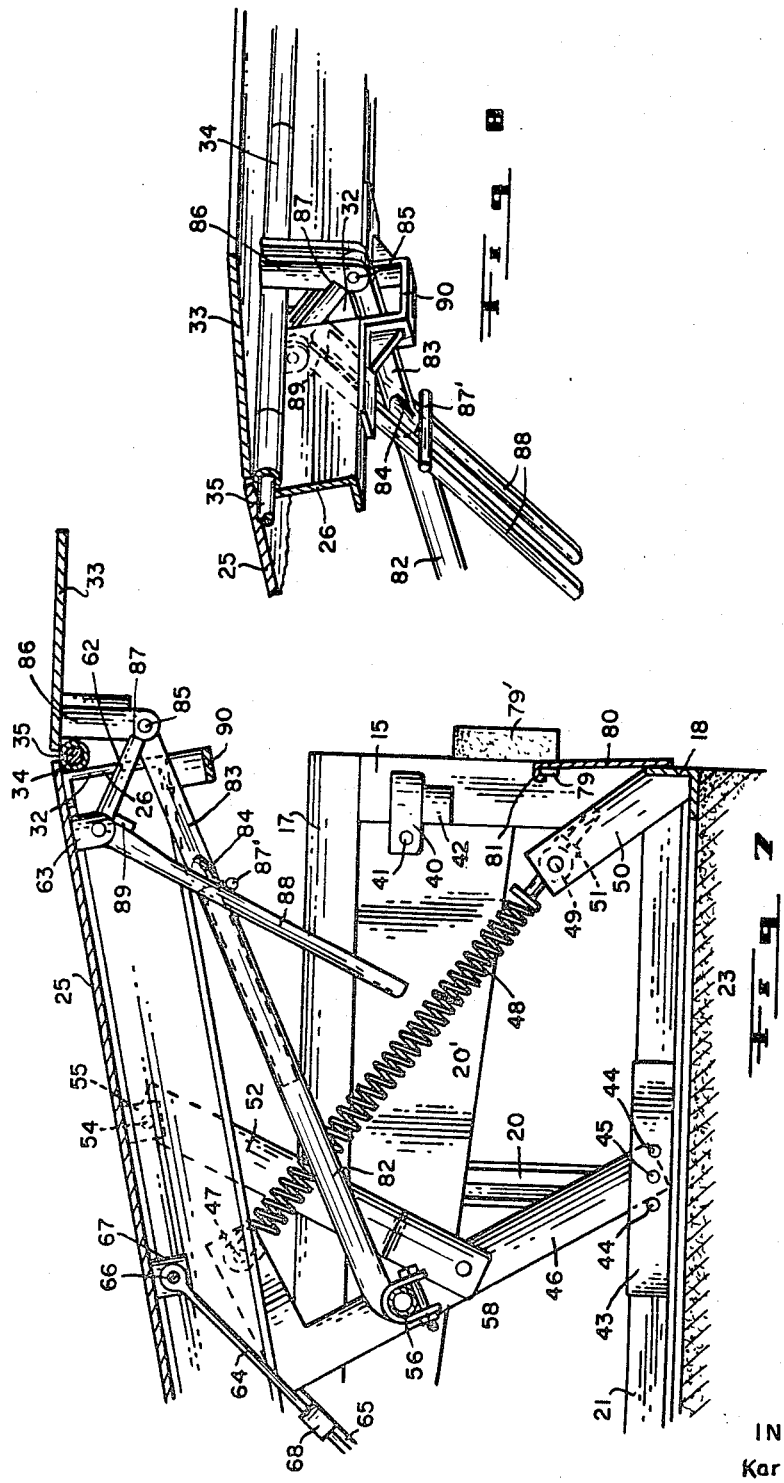

United States Patent Office 3,335,442
Patented Aug. 15, 1967

3,335,442
DOCK LEVELLING UNITS
Karl Kumpolt, 1477 Erin St., Winnipeg 10,
Manitoba, Canada
Filed Mar. 23, 1965, Ser. No. 442,084
2 Claims. (Cl. 14—71)

This invention relates to loading docks for cargo trucks to load onto or from, and such docks are usually adapted for servicing a number of such trucks at the same time. While the carrying floors of trucks may vary in height, especially when loaded or unloaded, the platform height of the dock is constant, so great difficulty is often experienced in moving heavy loads from one to the other, due to the step therebetween.

The principal object of the present invention is: to provide a ramp support or leveller unit for pit-reception in the platform of a dock, and such that it can be operated to bridge from the dock to the floor of a truck, for cargo passage thereover.

A further object of the invention is: to hinge-mount the ramp of the unit in a spring-loaded manner, so the front of said ramp can be resiliently raised above the floor of a truck spotted thereinfront, and provide a floating contact for a pivoted flap on the ramp with the truck floor.

A further object of the invention is: to provide a clamping brake means on the unit for restricting the pivoting movement of the ramp, and for releasably locking same at various sloping positions.

A further object of the invention is: to provide means for lowering the ramp by weight thereon, from the elevated position mentioned to a truck floor contacting position of the flap therewith, and such that said flap will fall to a closure position in front of the unit, when the truck moves away.

A still further object of the invention is: to provide means on the unit for supporting the ramp in a flush position with the platform of the dock, for cross traffic thereover.

Still further objects of the invention are: to construct the device as an attachment, for quick insertion in the dock platform; of a simple rugged design, for low manufacturing and maintenance costs; for trouble free operation over a long period of time, while completely free from piping, wiring, pumps, gears, valves or motors, which require so much expensive service.

With the above important and other minor objects in view, which will become more apparent as the description proceeds, the invention consists essentially in the design, construction and arrangement of the various parts hereinafter more particularly described, reference being had to the accompanying drawings wherein like characters of reference indicate corresponding parts in the several figures, and wherein:

FIGURE 1 is a perspective view of a pair of dock leveller units, each pit received in a loading dock, one unit flush with the dock platform, and the other unit with its ramp removed to show the controlling mechanism.

FIGURE 2 is a vertical longitudinal section taken centrally through a dock leveller unit, with the ramp thereof in horizontal position.

FIGURE 3 is a vertical longitudinal section as in FIGURE 2, but showing the pivoted position of the ramp.

FIGURE 4 is a partial vertical section taken on the line 4—4 of FIGURE 2.

FIGURE 5 is a partial vertical section taken on the line 5—5 of FIGURE 4.

FIGURE 6 is an enlarged perspective view of the forked flap lever.

FIGURE 7 is a partial longitudinal section, similar to FIGURE 3, but showing a modified construction for lifting and releasing the flap.

FIGURE 8 is a partial perspective view of FIGURE 7 and the modified parts therein.

A concrete loading dock is generally indicated at 10 in FIGURE 1, and presents an upper surface or platform 11 for passage of loading trucks thereover. At spaced intervals therealong the outer corner of this dock is provided with suitable rectangular openings or pits 12, to receive the dock leveller units 13 and 14, now to be described, and which constitute the present invention.

The frame of each dock leveller unit comprises: two front corner angle posts 15 and rear corner angle posts 16 which are connected by side upper and lower angle rails 17. The two front posts and the two rear posts are joined at their lower ends by base angles 18, while the upper ends of the rear posts support a cross I-beam 19. The upper side rails 17 and the I-beam 19 are flush and further reinforced by centrally spaced vertical angles 20, while the sides receive sheet metal curtains 20′ thereover. The front and rear lower base angles 18 are centrally connected by a pair of spaced base angles 21 which in turn are connected, slightly behind centre, by a short cross angle 22. All these angles, curtains and the I-beam 19 are welded together to form a rigid open framework 23, which is snugly received in one of the pits 12, in flush relation with the dock platform. The open front side of the framework faces outwardly of the dock to receive cargo trucks, and is held in place by flat rear anchor plates, shown at 24 in FIGURE 1.

A rectangular-shaped ramp 25 is flush received within the walls of the framework 23. This ramp comprises a rectangular anti-skid raised plate, which is reinforced thereunder by front and rear cross channel irons 26 and 27 respectively. These channels are centrally connected by a further pair of spaced lengthwise channels 28, forming a frame. The channel 27 carries a series of spaced plates 29 thereacross (FIGURES 2 and 3), which extend back and are received between pairs of forwardly extending spaced plates 30, carried by the I-beam 19. Pins 31 connect these plates to form rear hinges for the ramp 25 to swing on. The front cross channel 26 is separated at the centre, to provide a spacing 32 for a purpose later explained.

An overhang plate or flap 33 is hinged at 34 to the front edge of the ramp plate 25. The hinge in this instance is formed from a plurality of short aligned tubings having a pin 35 therethrough to form a piano hinge, the tubings being alternately welded to either the ramp plate 25 or the flap 33. A narrow metal strip 36 (FIGURE 2) is welded at an angle along this hinge for further strength. A forked lever 37, best shown in FIGURE 6, has its two upper legs welded to the central portion of the strip 36 such that it hangs therefrom, while its lower leg ends are connected by a circular solid boss 38. Each end of the flap 33 has a beak-shaped plate 39 projecting inwardly toward the framework. When the ramp 25 is in normal flush relation with the dock platform, or horizontal, as in FIGURE 5, the flap 33 hangs vertical as a closure for the front end of the framework, and these beak-shaped plates rest on dogs 40. The dogs have their rear ends pivoted at 41 to the side curtains 20′ of the framework. The front ends of the dogs rest on side lugs 42 carried by the interior walls of the front posts 15. Accordingly, solid support is provided for the ramp plate to permit cross traffic thereover.

A pair of fish plates 43 are each positioned on their edge and welded to one of the horizontal flanges of the base angles 21, in spaced relation from the vertical flanges thereof. Three holes 44 are drilled through the fish plates, including the opposite vertical angle flanges, for the reception of cross pins 45 thereacross, the holes 44 providing three adjustments. A pair of inverted L-shaped arms 46 have their long ends pivoted on these latter pins. The upper short offset ends of the arms each receive a cross pin 47 which extends on either side thereof to receive the hooked ends of pairs of coil springs 48. These latter springs project ahead and pass through adjustable mountings 49, each carried in a pair of spaced anchor plates 50 on the front base angle 18. By tightening or releasing the nuts 51 on these mountings, the springs can be increased in tension or released respectively. The resilience of these springs tend to pull the arms 46 around the pivots 45.

A pair of connecting links 52 each have one end spanned over and pivoted at 53 to the centre of one of the L-shaped arms 46, while the other end is pivoted at 54 on a bracket 55 which is welded to the bottom of the ramp 25. A cross tubing 56 connects the L-shaped arms together, just above the link pivots. The central part of this latter cross tubing pivotally receives the rear end of a pitman 57, which extends ahead in a slight upward slant, to pass through a loop 58 of strap iron, weld supported from the bottom of the ramp 25. The front end of the pitman terminates in a enlarged head 59, having a curved front edge 60. This head is positioned in the spacing 32 of the front channel iron 26 and passes into the forked lever 37 of the flap 33, with the legs of said lever on each side. It will be noted in FIGURES 2 and 3 that the boss 38 of this forked lever rides the curved front edge 60 of the pitman. A pin 61 extends outwardly on each side of the pitman head 59 and is in contact with the hanging legs of a forked locking bar 62, which is pivotally suspended from a bracket 63 on the bottom of the ramp plate 25.

From the above described mechanism it will be seen that the resiliency of the four coil springs 48 is acting to swing the L-shaped arms 46 upwardly on the pivot pins 45, and through the links 52, raise the ramp plate 25 on its hinge pins 31, as shown in FIGURE 3. A pair of rub bars 64 and 65 tend to prevent this movement. The upper end of the bar 64 is pivoted at 66 in a bracket 67 welded to the underside of the ramp 25. The bar 65 underlies the bar 64, slidingly retains and guides it by side wrapped-over fingers 68 and 69, while the lower end of the bar 65 is pivotally received in a bracket 70 carried by the cross angle 22. The bar 65 is also provided with a pair of rearwardly extending lugs 71, one on each side of the bar 64 and positioned between the fingers 68 and 69. A horizontal control lever 72 carries a front cam 73, which is pivoted at 74 between the lugs 71, and the weight of this lever is constantly tending to turn the cam and clamp the rub bars 64 and 65 together in a friction grip. Accordingly, the ramp 25 is locked against rising movement. However, a shallow well 75 is formed centrally at the rear end of the ramp and receives a ring 76 therein. A cable 77 passes from this ring down through the bottom of the well, through a hole in the rear end of the lever 72, and is then provided with a stop 78. When the ring is manually lifted, the stop 78 lifts the end of the lever 72 and the cam releases the rub bars. The ring is then dropped back into the well and the cam again clamps the rub bars together. The weight of a man or the passage of a truck up the ramp will cause the ramp to again swing down to its original horizontal position, as the cam 73 will have a tendency to rotate and lift the control lever 72 by the friction of the bar 64 past the cam.

The operation of the dock levelling unit is as follows, assuming it is in the position shown in FIGURE 2. When a cargo truck is ready to back up to the dock at this unit, an attendant lifts and pulls on the ring 76, thus causing the ramp to elevate, as shown in FIGURE 3. As the L-shaped arms 46 pivot in this operation, they move the pitman 57 ahead, pushing the forked lever 37 and causing the flap 33 to swing up to the horizontal position. At the same time, the pin 61 swings the legs of the bar 62 into locking engagement with the forked lever 37, as shown in the said FIGURE 3. The cargo truck then backs up to the rubber bumpers 79 on the front corner posts 15 of the framework, and the ramp 25 is lowered as mentioned by a man's weight thereon, or by driving a load truck thereon, until the flap 33 contacts the floor of the cargo truck. This releases the locking bar 62, which falls down back onto the pin 61. Accordingly, a bridge-contact is made between the dock platform and the truck floor so cargo can be moved thereover. When the cargo truck moves away, the unsupported flap 33 falls down and returns to the position shown in FIGURE 2.

If the cargo truck floor is lower than the dock platform, the ramp will accordingly move further down under the weights mentioned to accommodate the extra distance, but the flap 33 will remain flat on the truck floor. When this cargo truck moves away, the flap 33 will fall down, but the beak-shaped plates 39 at each end thereof will move into the framework, but below the dogs 40, so the ramp plate will have no support, except from the springs 48. By pulling the ring 76 however, the ramp 25 will rise by the power of these springs, and the upper curved corner of the plates 39 will lift the dogs and clear them, so the ramp will again be solidly supported, when it moves down under the mentioned weights. It might be mentioned that if the ring 76 is pulled and no truck is below to release the locking bar 62, this bar will have to be released by an attendant lifting the flap. Naturally, as such a movement will have no advantage, this ring pulling will only occur by accident or mistake.

To insure that the front of the framework 23 is completely closed, when the flap 33 is down, a pair of inward projecting lugs 79 are welded on the interior wall of the front corner posts 15 (see FIGURE 1). A flat elongated closure plate 80 has one longitudinal edge thereof bent over in a roll 81. The ends of this rolled edge are hooked onto the lugs 79, so the plate 80 hangs therefrom, in a position below the flap 33.

A modified construction for operation of the flap 33 is shown in FIGURES 7 and 8. In this arrangement, the pitman 57 is replaced by a tubing or cylinder 82, which receives a smaller tubing or piston indicated at 83 in dotted outline. The front end of this piston is enlarged at 84 to form a shoulder stop and then extends ahead in a bar which terminates in a pivot 85 between the lower forked ends of a lever 86 which is welded to the flap 33 adjacent the hinge 34. The same bracket 63 and forked locking bar 62 are used, and said locking bar is adapted to catch in a notch 87 on the lever 86. However, a short cross rod 87' is welded under the upper end of the tubing or cylinder 82. A pair of parallel legs 88 have their upper ends pivoted, one on either side of the locking bar 62, and on the pivot therefor. These legs are connected by an under cross bar 89, directly under the locking bar, and for its support, while the lower ends of the legs ride on the cross rod 87'.

In operation: when the coil springs 48 elevate the ramp plate 25, the tubing or pitman 82 moves ahead. It pushes the enlargement 84, and the front end of the pitman 83 turns the lever 86 on the hinge pin 35, and lifts the flap 33 to its horizontal position, shown in FIGURE 7. During this operation, the legs 88 swing down by gravity and cause the cross bar 89 to lift the locking bar 62 into engagement with the notches 87 as shown, to hold the flap in position. As the ramp plate 25 later lowers under the weight mentioned, for release-contact of the flap 33 with the cargo truck floor, the tubing pitman 82 moves back, opening up slightly at the enlargement 84, but taking the cross rod 87' with it, and this cross rod swings the legs 88 rearwardly to clear the cross bar 89 from the locking bar 62. Accordingly, when the flap 33 touches the truck floor, it releases the locking bar 62, which drops by gravity back onto the cross bar 89 and the flap 33 is free to fall in the manner previously explained, when the cargo truck moves away.

In summing up: the dock levelling device is built as a unit; it can be easily crane-lowered into its pit-working position on the dock, and secured in place; the ramp of the dock leveller unit can be raised or lowered as desired for a loading slope between the dock and a cargo truck by merely releasing the cam 71, and then stepping on the raised ramp plate, or driving a lift truck thereon; and it can be positioned horizontally flush with the dock platform for cross traffic thereover, when the cargo truck has departed.

What I claim as my invention is:

1. In a dock levelling unit: a rectangular open framework hinge supporting one side of a normally horizontal ramp plate therein; an arm having one end thereof pivotally mounted on said framework; a link having one end thereof pivoted to said arm and the other end thereof pivoted to said ramp plate; adjustable spring means between the opposite end of said arm and said framework for normally and resiliently pivoting said arm and raising the opposite side of said ramp plate on the hinge support thereof; a pair of rub bars having opposite ends of each connecting said framework with said ramp plate; a cam pivotally mounted on one of said bars and normally clamping said bars together to frictionally resist the elevational movement of said ramp plate; a horizontal dog having one end thereof pivotally supported on the framework and the other end thereof supported on a framework lug; a flap member hinged to the outer side of said ramp plate for suspension therefrom; a beak-shaped plate on said flap member normally resting on said dog for support of the opposite side of said ramp plate, the curved surface of said beak-shaped plate being on its upper edge, manual means for releasing said cam which frictionally clamps said bars, to permit raising said flap member in response to upward movement of said ramp plate, means for locking said flap member in raised position relative to said ramp plate, said locking means being de-activated when said flap member contacts a truck bed as the ramp plate is lowered, whereby the flap member will drop when said truck bed is withdrawn; said beak-shaped plate adapted to swing under said dog in said latter flap member movement, when the withdrawn truck bed is lower than the ramp plate; and said dog liftable on its pivotal support by said beak-shaped plate to clear said plate therepast in the elevation of the ramp plate.

2. In a levelling unit for a loading dock: a rectangular open framework pit receivable in said dock, and hinge-supporting one side of a normally horizontal ramp plate therein; an arm swingably mounted on the framework and normally resiliently operable to pivot the arm and elevate the opposite side of the ramp plate; frictional means interposed between the lower part of the framework and the bottom of the ramp plate, to restrict the elevation of said latter plate; a horizontal dog having one end thereof pivotally supported on the framework and its opposite end supported on an outwardly projecting lug of the framework; a flap member hinge-suspended from the opposite side of the ramp plate and carrying a beak-shaped plate normally resting on said dog, for support of said opposite side of the ramp plate; manual means for releasing said frictional means, for elevation of said ramp plate by said resiliently operable arm; a pitman having one end thereof pivoted on said operable arm and the other end thereof slidable through a looped strap on said ramp plate and provided with a cross pin; a forked locking bar hinge-suspended from said ramp plate and straddling said pitman; said opposite end of the pitman adapted to up-swing said flap member during the elevation of the ramp plate, until said cross pin swings the locking bar into engagement with said flap member for its support in said upswung position; said ramp plate adapted to swing down, partially releasing said frictional means, when weight is applied on said ramp plate, and said locking bar adapted to gravity release from the flap member, when said latter member contacts a support, in the swing down movement of the ramp plate.

References Cited
UNITED STATES PATENTS

| | | | |
|---|---|---|---|
| 3,117,332 | 1/1964 | Kelley | 14—71 |
| 3,203,019 | 8/1965 | LeClear | 14—71 |
| 3,249,956 | 5/1966 | Zajac | 14—71 |

JACOB L. NACKENOFF, *Primary Examiner.*